Aug. 7, 1945.  E. J. COLE  2,380,944
COLD ROLLED GRIP BOLT
Filed May 16, 1944

Inventor
Edward J. Cole,
By Leech & Radue,
Attorneys

Patented Aug. 7, 1945

2,380,944

UNITED STATES PATENT OFFICE 2,380,944

COLD ROLLED GRIP BOLT

Edward J. Cole, Peekskill, N. Y., assignor to Cole Machinery Mfg. Corp., a corporation of New York Application May 16, 1944, Serial No. 535,849

6 Claims. (Cl. 151—14)

This invention relates to a bolt or other threaded member wherein the threaded portion thereof is modified to create a friction grip on a cooperating apertured threaded member, such as a nut, threaded holes in machine parts, etc., which are threaded thereon. More particularly the invention pertains to a bolt, cap screw or other similar threaded member adapted to be joined to a threaded apertured member so that when the bolt, screw or other threaded member is screwed into such parts it will be held in tight friction engagement therewith and not loosen up from vibration or other working conditions.

An object of the invention is to provide a cold rolled bolt or other threaded member wherein the threads are rolled thereon in a single operation. In practice a cold rolled bolt of standard form may be rolled between the threading dies and the thread lock of the bolt generated thereon in a single operation without machining or additional manipulation.

Another object of the invention is the production of a cold rolled and threaded stem member having a standard S. A. E. or other standard threads wherein at least one complete convolution of the thread in the intermediate portion of the threaded section will be of sightly increased diameter over the diameter of the adjacent threads. Preferably in addition to the enlarged diameter convolution, the next adjacent convolutions on opposite sides of the increased diameter convolutions are of slightly less diameter, and the remaining convolutions of the thread on opposite sides of the last mentioned convolutions are of standard convolutions and uniform diameters.

It is also the object of this invention to produce bolts, screws and other threaded parts, as described above, by other methods than cold rolling, such as hot rolling, machining, etc.

Figure 1:
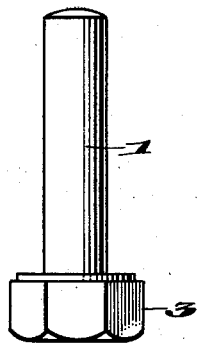
Fig. 1 shows a conventional bolt blank having a shank and integral wrench engaging head. It will be understood that this is merely by way if illustration and that the invention is applicable to any type of threaded shank for use as a bolt, lag screw or the like, having any type of head.
Figure 2:
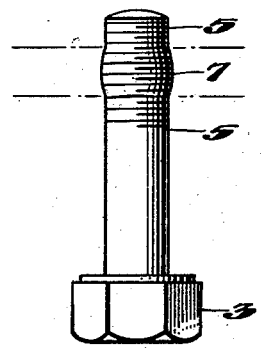
Fig. 2 illustrates a finished grip bolt after the blank of Fig. 1 has been threaded by the cold rolled process.

In the drawing numeral 1 denotes the shank of a conventional bolt or other threaded member having an integral wrench engaging head 3 thereon. As shown in Fig. 2 the threaded section of the bolt or other member is conventionally threaded at its inner and outer portions, as indicated by numerals 5—5 and is slightly enlarged at its intermediate or central portion 7. The outer configuration or profile of the threaded portion of the bolt or other member indicates that it is slightly uniformly bulged, or in other words, is provided with a slightly arcuate increasing crest line. The root line 13 of the threaded portion is of uniform depth throughout the entire threaded section.

Figure 3:
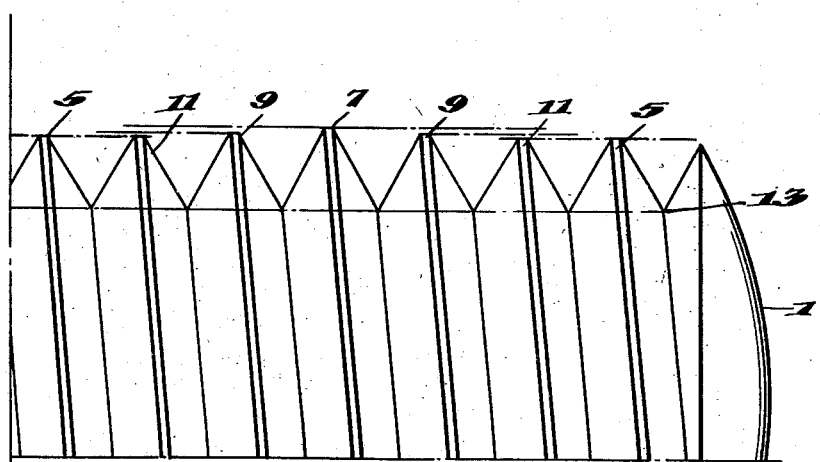
Fig. 3 is an enlarged view of the threaded portion of the bolt or other threaded member embodying the principles of this invention.

Fig. 3 shows the invention in enlarged form, and here the intermediate convolution 7 of the thread is of slightly larger diameter than the adjacent convolutions 9—9 on either side thereof, although these latter convolutions are very slightly greater in diameter than the remainder of the convolutions 11—11 of the thread. In other words, the several convolutions 11—11 at the beginning and end of the thread are of the same diameter and configuration specified by the Standard Practice of the Society of Automotive Engineers, so that an arc passing from the crest of the standard convolutions 11—11 over the enlarged friction gripping convolution 7—7 describe an arc with the intermediate enlarged threads 9—9. The several convolutions are all of standard specifications in cross-sectional form regardless of the diameter of the crest lines and all convolutions of the thread have a uniform root or base line, as indicated by horizontal line 13. The slightly arcuately increasing central longitudinal profile of the threaded portion of the bolt or other member is clearly illustrated by the dash lines in Fig. 3 which is drawn across the crests of the several convolutions.

Preferably, though not necessarily, the present improvement is carried out by the well known cold rolled process wherein bolt blanks or other members are rolled between pressure dies. The dies are formed to give the threaded profile shown in Fig. 3, and in practice it has been found that no additional metal is necessary to give the small increased diameter of the friction convolutions 9—9 and 7 as there is enough flow or manipulation of the metal during the cold rolled process to slightly increase the diameter of these convolutions, including the central enlarged diameter convolution 7.

In the prior art a number of proposals have been made, such as in the patent to Ryan, No. 1,064,934, by gradually increasing the depth of the convolutions of the thread running from the bolt end toward the unthreaded shank of the bolt.

It has also been proposed to thread a shank member and split the shank after which the split portions are bowed outwardly, whereupon the larger diameter of the bulged portion binds against the nut or other member threaded thereon. These proposals have not been successful in commercial use and they are difficult and costly to manufacture, and furthermore great difficulty is encountered in initially starting the threaded apertured member, such as a nut, thereon. With the present invention the bolt thread at the outer end thereof is of standard specifications and the bolt readily enters the threaded bore: as the bolt enters the threaded bore it is gradually frictionally or elastically engaged by the side walls of the increased diameter convolutions 9 and 7, and while the friction created by the enlarged diameter convolutions 7 is sufficient to retain the nut or threaded member thereon and prevent its becoming unthreaded by vibrations or other sources, it is not sufficient to prevent the bolt from being removed when desired.

I claim:

1. A threaded grip member for engagement with an apertured threaded member, the thread on said grip member having a uniform root line thereon and having a slightly arcuate crest line longitudinally of the ends of the threaded portion.

2. In a grip bolt of the type having a conventional threaded shank and head, the improvement therein of forming the threaded portion with a uniform root line throughout and a slightly arcuately increasing crest line intermediate the ends of the threaded portion.

3. A grip thread for threaded members adapted to cooperate with a threaded bore, wherein the thread of the threaded member is gradually increased and decreased in diameter in relation to the uniform diameter of the end portions of the thread the root line of the entire thread is a uniform helix lying on the surface of an imaginary cylinder.

4. An externally threaded member adapted to be threaded into an elastic grip with an internally threaded member wherein the profile of the diameter of the crest line of a desired longitudinal portion of the externally threaded member is of arcuate form and the profile of the diameter of the longitudinal crest line of the remainder of the thread is uniform of lessor diameter the root of the thread being of uniform diameter throughout.

5. A threaded member wherein at least one convolution of the thread in the mid portion thereof is of slightly greater outer diameter than the remainder of the threads, but of the same interior diameter.

6. A threaded bolt shank in which one or more convolutions of the thread thereof is of somewhat greater diameter than the other convolutions of the thread and with the convolutions of the thread on either side of the greater convolution intermediate in diameter between it and the remainder of the thread, whereby the greater diameter convolutions form a slightly arcuate bulged portion in any desired zone of the threaded portion, the root line of the threaded bolt shank being a uniform helix lying on the surface of an imaginary cylinder.

EDWARD J. COLE.